(12) United States Patent
Yi et al.

(10) Patent No.: US 9,187,916 B2
(45) Date of Patent: Nov. 17, 2015

(54) BOOM SYSTEM, ENGINEERING MACHINERY, AND A METHOD FOR ACQUIRING BOOM SYSTEM DISTAL END POSITION PARAMETER

(75) Inventors: Xiaogang Yi, Changsha (CN); Zuoliang Zhang, Changsha (CN); Dong Li, Changsha (CN)

(73) Assignees: Hunan Sany Intelligent Control Equipment Co., LTD (CN); Sany Heavy Industry Co., LTD (CN)

( * ) Notice: Subject to any disclaimer, the term of this patent is extended or adjusted under 35 U.S.C. 154(b) by 0 days.

(21) Appl. No.: 14/376,748

(22) PCT Filed: Apr. 17, 2012

(86) PCT No.: PCT/CN2012/074171
§ 371 (c)(1),
(2), (4) Date: Oct. 23, 2014

(87) PCT Pub. No.: WO2013/117050
PCT Pub. Date: Aug. 15, 2013

(65) Prior Publication Data
US 2015/0081164 A1 Mar. 19, 2015

(30) Foreign Application Priority Data

Feb. 8, 2012 (CN) .......................... 2012 1 0027237
Apr. 17, 2012 (WO) ................ PCT/CN2012/074171

(51) Int. Cl.
*E04G 21/04* (2006.01)
*G01B 21/22* (2006.01)
*B66C 23/90* (2006.01)
*G01B 21/16* (2006.01)

(52) U.S. Cl.
CPC .......... *E04G 21/0463* (2013.01); *B66C 23/905* (2013.01); *E04G 21/0445* (2013.01); *G01B 21/16* (2013.01); *G01B 21/22* (2013.01)

(58) Field of Classification Search
CPC ............ E04G 21/0463; E04G 21/0445; B66C 23/905; G01B 21/16; G01B 21/22
USPC ......................................... 701/34.4
See application file for complete search history.

(56) References Cited

U.S. PATENT DOCUMENTS 7,852,229 B1 * 12/2010 Gohl .............................. 340/685
2009/0030580 A1 * 1/2009 Doi ................................ 701/50

FOREIGN PATENT DOCUMENTS

CN 101306789 11/2008
CN 101348216 1/2009
(Continued)

OTHER PUBLICATIONS

Search Report and Written Opinion dated Nov. 8, 2012 for corresponding International Application No. PCT/CN2012/074171 (10 pgs.)

*Primary Examiner* — Richard Camby
(74) *Attorney, Agent, or Firm* — Timothy S. Westby; Porter Hedges LLP

(57) ABSTRACT

The present invention provides a boom system, comprising a plurality of joint arms sequentially hinged through a horizontal hinge shaft, and further comprising: mounting two length sensors on each joint arm, wherein one length sensor measures the length of a corresponding joint arm after deformation, and the other length sensor measures the length between it and the distal end of the corresponding joint arm, and there is a preset distance between the two length sensors; mounting a dip angle sensor on each joint arm, and obtaining the angle between the connection line between the two length sensors and a reference plane; a processor which obtains boom system distal end position parameters according to the detection results of the dip angle sensor and the length sensors. The boom system according to the present invention, for a single joint arm, uses a single dip angle sensor and double draw line coders to obtain the distal end position parameters of the joint arm, and can more accurately obtain the boom system distal end position parameters. The present invention also provides an engineering machinery and a boom system distal end position parameter obtaining method.

13 Claims, 2 Drawing Sheets

(56) References Cited

FOREIGN PATENT DOCUMENTS

| CN | 101525944 | 9/2009 |
|---|---|---|
| CN | 101750620 | 6/2010 |
| CN | 101804945 | 8/2010 |
| CN | 101891125 | 11/2010 |
| CN | 102032884 | 4/2011 |
| CN | 102322497 | 1/2012 |
| CN | 102338191 | 2/2012 |
| GB | 2357749 | 7/2001 |
| JP | 3238300 | 10/1991 |

* cited by examiner

BOOM SYSTEM, ENGINEERING MACHINERY, AND A METHOD FOR ACQUIRING BOOM SYSTEM DISTAL END POSITION PARAMETER

CROSS-REFERENCE TO RELATED APPLICATIONS

This application is the national phase entry of PCT Application No. PCT/CN2012/074171, which claims the priority of Chinese Patent Application No. 201210027237.X, entitled "Boom System, Engineering Machinery and a Method for Acquiring Boom System Distal End Position Parameter", filed on Feb. 28, 2012 with the State Intellectual Property Office of the PRC, which is incorporated herein by reference in its entirety.

STATEMENT REGARDING FEDERALLY SPONSORED RESEARCH OR DEVELOPMENT

Not Applicable.

TECHNICAL FIELD

The present invention involves the technical field of boom control, and particularly, relates to a boom system, an engineering machinery and a boom system distal end position parameter obtaining method.

BACKGROUND

Multi joint mechanical arms, as fluid material conveying devices, have been widely used in fields such as concrete conveying, high-altitude fire-fighting operation and port refueling due to advantages such as good universality, wide operation range and flexible operation, and have become inevitable high-end technical devices in national construction.

A boom system usually comprises a plurality of joint arms, and the large head end of the first joint arm is hinged with a predetermined chassis through a vertical shaft; the large head ends of the other joint arms are hinged with the small head ends of adjacent joint arms through a horizontal hinge shaft; therefore, a plurality of joint arms are sequentially hinged through the horizontal hinge shaft, and the joint arm at the distal end extends outwards and is called a distal end joint arm, and the outer end of the distal end joint arm forms a boom system distal end; driving mechanisms such as hydraulic cylinders are provided between adjacent joint arms, so that the angles between adjacent joint arms generate a predetermined change, which changes the position of the boom system distal end so as to convey materials or articles to a predetermined position.

As a mechanical arm is affected by dead weight and construction postures, a rigid flexible coupling mechanical arm deforms in a complex way, which seriously affects its distal end positioning precision. To obtain the postures of the mechanical arm and achieve precise positioning of the distal end of the mechanical arm, usually a proper coordinate system is established in a control system, and the coordinate parameters of the coordinate system are used to determine the positions of the hinged points of the joint arms of the mechanical arm, and the deformations of respective joint arms are considered to finally determine the actual distal end position of the mechanical arm, and the coordinate parameters of the distal end position are called position parameters.

In addition, during using the boom system to work, each joint arm bears corresponding load, and generates corresponding deformation; the accumulation of deformations of a plurality of joint arms will result in a large deviation between the position parameters of the boom system distal end and target position parameters.

To reduce the deviation of the position parameters of the boom system distal end rendered by the deformation of the mechanical arm, one manner for obtaining the distal end position parameters in the related art is to use two dip angle sensors to obtain the deformation amounts of corresponding joint arms and then correct the position parameters of the joint arms according to the deformation amounts. Although this manner can improve the accuracy of the boom system distal end position parameters, due to the restriction by the measuring precision of the dip angle sensors, the deviation between the position parameters of the boom system distal end and the target position parameters is still large, and the demands of accurate positioning and control on the boom system distal end cannot be met.

Therefore, how to improve the accuracy of the boom system distal end position parameters is still a technical problem to be solved by one skilled in the art.

SUMMARY

In consideration of the above background art, one technical problem to be solved by the present invention is to provide a boom system, a further technical problem to be solved by the present invention is to provide an engineering machinery comprising the boom system, and another technical problem to be solved by the present invention is to provide a boom system distal end position parameter obtaining method, which can more accurately obtain the boom system distal end position parameters.

According to an aspect of the present invention, a boom system is provided, comprising n joint arms sequentially hinged through a horizontal hinge shaft, and further comprising: a processor (200), n dip angle sensors (106) and 2n length sensors, and n is a positive integer, wherein each joint arm is mounted with a first length sensor (102) and a second length sensor (104); at the $i^{th}$ joint arm, the predetermined distance between the second length sensor (104) and the first length sensor (102) is $L_{ai}$, the length $L_{bi}$ of the $i^{th}$ deformed joint arm is obtained through the first length sensor (102), and the length $L_{ci}$ between the second length sensor (104) and the distal end of the $i^{th}$ deformed joint arm is obtained through the second length sensor (104); each joint arm is mounted with one said dip angle sensor (106), an angle $\alpha_i$ between the connection line between the first length sensor (102) and the second length sensor (104) and a reference plane is obtained, wherein i=1, 2, . . . , n; the processor (200) obtains the boom system distal end position parameters $(x'_{tip}, y'_{tip})$ according to the detection results of the dip angle sensor (106) and the length sensors:

$$x'_{Tip} = \sum_{i=1}^{n} L_{bi} \cdot \cos\left(\arccos\frac{L_{bi}^2 + L_{ai}^2 - L_{ci}^2}{2 L_{ai} \cdot L_{bi}} - \alpha_i\right),$$

$$y'_{Tip} = \sum_{i=1}^{n} L_{bi} \cdot \sin\left(\arccos\frac{L_{bi}^2 + L_{ai}^2 - L_{ci}^2}{2 L_{ai} \cdot L_{bi}} - \alpha_i\right).$$

In the above technical solution, preferably, the connection line between the first length sensor and the second length sensor is perpendicular to the extending directions of corresponding booms, and the dip angle sensor is mounted between two length sensors.

In the above technical solutions, preferably, the first length sensor is a first draw line coder, and the body of the first draw line coder and a draw line outer end are respectively connected with two ends of corresponding joint arms. The draw line coder has higher precision, and can accurately measure the length of a corresponding joint arm, and then can more accurately obtain the boom system distal end position parameters.

In the above technical solution, preferably, the second length sensor is a second draw line coder, and the body of the second draw line coder and a draw line outer end are respectively connected with two ends of corresponding joint arms; the vertical line between the basic axis of the body of the first draw line coder and the basic axis of the body of the second draw line coder is perpendicular to the draw line of the first draw line coder, and the draw line outer ends of the two draw line coders are connected to the same fixing point.

In the above technical solution, preferably, the basic axis of the body of the first draw line coder overlaps the hinge axis at one end of a corresponding joint arm, and the fixing point of the draw line outer ends overlaps the hinge axis at the other end of the corresponding joint arm; or, the basic axis of the body of the first draw line coder has a predetermined distance with respect to the hinge axis at one end of the corresponding joint arm, and the fixing point of the draw line outer ends overlaps the hinge axis at the other end of the corresponding joint arm.

In the above technical solution, preferably, the dip angle sensor is mounted between the body of the first draw line coder and the body of the second draw line coder, and the basic axis of the dip angle sensor intersects and is perpendicular to the hinge axis at this end. Therefore, the inclination angle of the joint arm as obtained is more accurate, and the boom system distal end position parameters can be obtained more accurately.

In the above technical solution, preferably, the dip angle sensors are respectively mounted at the large head ends of corresponding joint arms. Therefore, the error generated by the deformation rendered by the gravity of arm 1 can be avoided.

In the above technical solution, preferably, the processor is further preset with a design length $L_{ir}$ of the joint arms in the boom system; after the processor obtains the boom system distal end position parameters, the deformation amounts $\Delta x$ and $\Delta y$ of the boom system are obtained according to the following formulas:

$$\Delta x = x'_{Tip} - x', \quad x' = \sum_{i=1}^{n} L_i \cdot \sin\alpha_i,$$

$$\Delta y = y'_{Tip} - y', \quad y' = \sum_{i=1}^{n} L_i \cdot \cos\alpha_i,$$

The $L_i$ is the measurement length of the $i^{th}$ joint arm before deformation obtained through the first length sensor (102), and (x', y') are the distal end position parameters of the boom system before deformation; and the corrected boom system distal end position parameters ($x_{Tip}, y_{Tip}$) are obtained according to the following formulas:

$$x_{Tip} = \sum_{i=1}^{n} L_{ir} \cdot \cos\left(\arccos\frac{L_{bi}^2 + L_{ai}^2 - L_{ci}^2}{2L_{ai} \cdot L_{bi}} - \alpha_i\right) + \Delta x,$$

$$y_{Tip} = \sum_{i=1}^{n} L_{ir} \cdot \sin\left(\arccos\frac{L_{bi}^2 + L_{ai}^2 - L_{ci}^2}{2L_{ai} \cdot L_{bi}} - \alpha_i\right) + \Delta y.$$

According to another aspect of the present invention, an engineering machinery is provided, which comprises a machinery body and a boom system, and the boom system is mounted on the machinery body through a swing mechanism, which is the boom system described in any of the above technical solutions.

According to still another aspect of the present invention, a boom system distal end position parameter obtaining method is further provided, which comprises following steps: at each joint arm, a preset distance between a first length sensor and a second length sensor being $L_{ai}$, obtaining the length $L_{bi}$ of an $i^{th}$ joint arm which is deformed through the first length sensor, obtaining the length $L_{ci}$ between the second length sensor and the distal end of the $i^{th}$ deformed joint arm through the second length sensor, obtaining an angle $\alpha_i$ between the connection line between the first length sensor and the second length sensor and a reference plane, wherein i=1, 2, ..., n; and obtaining the boom system distal end position parameters ($x'_{tip}, y'_{tip}$) according to the following formulas:

$$x'_{Tip} = \sum_{i=1}^{n} L_{bi} \cdot \cos\left(\arccos\frac{L_{bi}^2 + L_{ai}^2 - L_{ci}^2}{2L_{ai} \cdot L_{bi}} - \alpha_i\right),$$

$$y'_{Tip} = \sum_{i=1}^{n} L_{bi} \cdot \sin\left(\arccos\frac{L_{bi}^2 + L_{ai}^2 - L_{ci}^2}{2L_{ai} \cdot L_{bi}} - \alpha_i\right).$$

The above solution uses a single sensor to detect the inclination angle of a corresponding joint arm, two length sensors and the distal end of a joint arm form a triangle, the two length sensors detect two adjacent sides of the triangle, and then the principles of the triangle are used to calculate the distal end position parameters of the joint arm, therefore, the accumulated error generated by the precision of the dip angle sensor in the prior art can be avoided, and the detection precision of the joint arm length can also be easily ensured through using a proper length sensor to detect the lengths of the joint arm before and after the deformation, and then the position parameters of the boom system distal end can be obtained more precisely.

In the above technical solution, preferably, the following step is further contained after obtaining the boom system distal end position parameters: obtaining the deformation amounts $\Delta x$ and $\Delta y$ of the boom system according to the following formulas:

$$\Delta x = x'_{Tip} - x', \quad x' = \sum_{i=1}^{n} L_i \cdot \sin\alpha_i,$$

$$\Delta y = y'_{Tip} - y', \quad y' = \sum_{i=1}^{n} L_i \cdot \cos\alpha_i,$$

The $L_i$ is the measurement length of the $i^{th}$ joint arm before deformation, and (x', y') are the distal end position parameters of the boom system before deformation; and the corrected boom system distal end position parameters ($x_{Tip}$, $y_{Tip}$) are obtained according to the obtained deformation amounts, and $L_{ir}$ is the design length of the $i^{th}$ joint arm:

$$x_{Tip} = \sum_{i=1}^{n} L_{ir} \cdot \cos\left(\arccos\frac{L_{bi}^2 + L_{ai}^2 - L_{ci}^2}{2L_{ai} \cdot L_{bi}} - \alpha_i\right) + \Delta x,$$

$$y_{Tip} = \sum_{i=1}^{n} L_{ir} \cdot \sin\left(\arccos\frac{L_{bi}^2 + L_{ai}^2 - L_{ci}^2}{2L_{ai} \cdot L_{bi}} - \alpha_i\right) + \Delta y.$$

Using the above solution can determine the deformation amount of the joint arm after deformation, and obtaining the boom system distal end position parameters based on the actual design length of the joint arm can avoid the data deviation rendered by the deviation between the measurement length of the length sensor and the design length of the corresponding joint arm, and then the boom system distal end position parameters can be obtained more precisely.

Based on providing the above method for obtaining the boom system distal end position parameters, the boom system provided by the present invention can implement the above method, and the corresponding technical effect can also be generated.

In the above technical solution, preferably, $L_{bi}$ is the measurement length between the hinge points at two ends of the $i^{th}$ deformed joint arm, $L_{ci}$ is the measurement length between the second length sensor and the hinge point at the distal end of the $i^{th}$ joint arm, $L_i$ is the measurement length between the hinge points at two ends of the $i^{th}$ joint arm before deformation, and $L_{ir}$ is the design length between the hinge points at two ends of the $i^{th}$ joint arm.

According to the technical solutions of the present invention, three-fixing point measuring (the mounting fixing point of the first draw line coder, the mounting fixing point of the second draw line coder and the hinge point of the small head end) is used to obtain the boom system distal end position parameters, using a single dip angle sensor reduces the error generated by the measuring error of the dip angle sensor, the draw line coding sensor is used to obtain the lengths of the mechanical arm before and after the deformation, the detection precision is high, the technical problem is solved that the deformation of traditional mechanical arms cannot be measured accurately, and precise and stable control over the distal end position can be achieved through obtaining the deformation amounts.

DETAILED DESCRIPTION

To more clearly understand the above purposes, features and advantages of the present invention, the present invention will be further detailed hereinafter in combination with drawings and embodiments.

The following description throws lights on many details for fully understanding of the present invention, however, the present invention can also be implemented with other manners different from those described herein; thus the present invention is not limited to the following disclosed embodiments.

To more clearly describe the technical solutions provided by the present invention, this part first describes the boom system as provided, and then the method for obtaining the boom system distal end position parameters is described based on the description of the boom system; the method for obtaining the boom system distal end position parameter can be used to implement the boom system provided by the present invention, while implementing the method is not limited to the boom system provided by the present invention.

Figure 1:
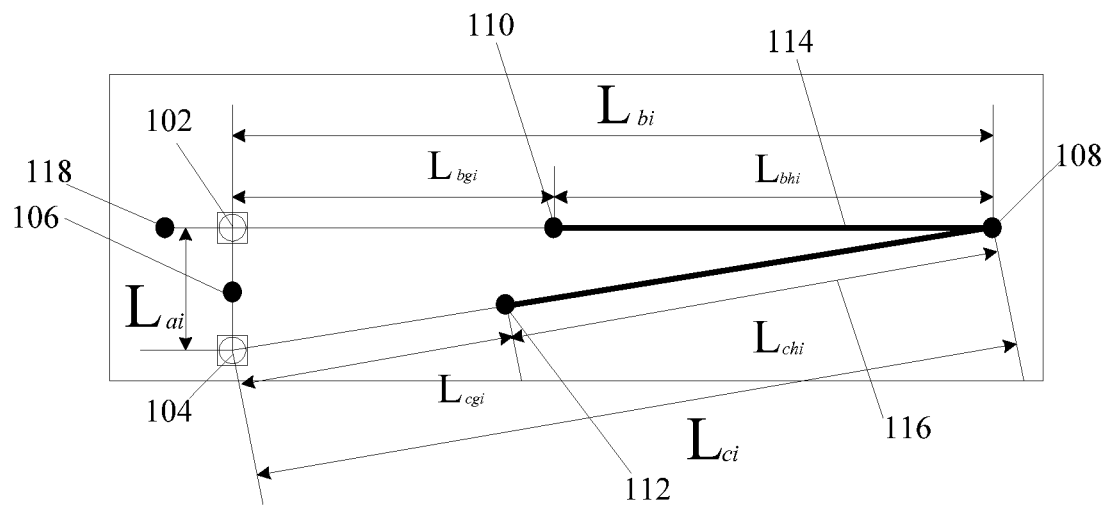
FIG. 1 is a schematic diagram of the sensor according to the embodiment of the present invention which is mounted on a single joint arm.
Figure 2:
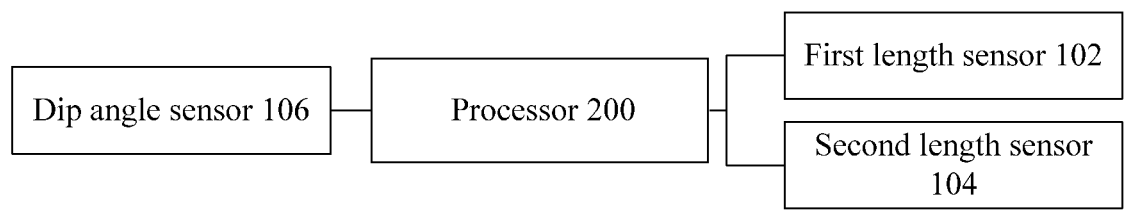
FIG. 2 is a schematic diagram of a control part in the boom system according to the embodiment of the present invention.

First, the boom system according to the present invention will be detailed in combination with FIG. 1 and FIG. 2, and FIG. 1 is a schematic diagram of the sensor according to the embodiment of the present invention which is mounted on a single joint arm, and FIG. 2 is a schematic diagram of a control part in the boom system according to the embodiment of the present invention.

The boom system according to the present invention comprises n joint arms sequentially hinged through a horizontal hinge shaft, and further comprises: a processor 200, n dip angle sensors 106 and 2n length sensors, and n is a positive integer, wherein each joint arm is mounted with a first length sensor 102 and a second length sensor 104 (referring to FIG. 1), the predetermined distance between the second length sensor 104 and the first length sensor 102 at the ith joint arm is Lai, that is, for each joint arm, there is a fixed distance between two length sensors, the length of the $i^{th}$ deformed joint arm obtained through the first length sensor 102 is $L_{bi}$, and the length data is transmitted to the processor 200, the length between the second length sensor 104 and the distal end of the $i^{th}$ deformed joint arm obtained through the second length sensor 104 is $L_{ci}$, and the length data is transmitted to the processor 200; each joint arm is mounted with one dip angle sensor 106, an angle $\alpha_i$ between the connection line between the first length sensor 102 and the second length sensor 104 and a reference plane is obtained (that is, each joint arm is mounted with a dip angle sensor 106, and the angle between the joint arm and the reference plane is measured), and the angle data is transmitted to the processor 200, wherein i=1, 2, . . . , n; the processor 200 obtains the boom system distal end position parameters ($x'_{tip}$, $y'_{tip}$) according to the detection results of the dip angle sensor 106 and the length sensors:

$$x'_{Tip} = \sum_{i=1}^{n} L_{bi} \cdot \cos\left(\arccos\frac{L_{bi}^2 + L_{ai}^2 - L_{ci}^2}{2L_{ai} \cdot L_{bi}} - \alpha_i\right),$$

$$y'_{Tip} = \sum_{i=1}^{n} L_{bi} \cdot \sin\left(\arccos\frac{L_{bi}^2 + L_{ai}^2 - L_{ci}^2}{2L_{ai} \cdot L_{bi}} - \alpha_i\right).$$

The distal end position parameters of each joint arm can be obtained with the cosine law, and the distal end position parameters of the last joint arm can be obtained according to the number of the joint arms in the boom system through adding the distal end position parameters of a plurality of joint arms together.

The above solution uses a single sensor to detect the inclination angle of a corresponding joint arm, two length sensors and the distal end of a joint arm form a triangle, the two length sensors detect two adjacent sides of the triangle, and then the principles of the triangle are used to calculate the distal end position parameters of the joint arm, therefore, the accumulated error generated by the precision of the dip angle sensor in the prior art can be avoided, and the detection precision of the joint arm length can also be easily ensured through using a proper length sensor to detect the lengths of the joint arm before and after the deformation, and then the position parameters of the boom system distal end can be obtained more precisely.

Based on the above structure, the connection line between the first length sensor 102 and the second length sensor 104 is perpendicular to the extending directions of corresponding booms, and the dip angle sensor 106 is mounted between two length sensors.

The first length sensor 102 is a first draw line coder, and the body of the first draw line coder and a draw line outer end are respectively connected with two ends of corresponding joint arms; the second length sensor 104 is a second draw line coder, and the body of the second draw line coder and a draw line outer end are respectively connected with two ends of corresponding joint arms; the vertical line between the basic axis of the body of the first draw line coder and the basic axis of the body of the second draw line coder is perpendicular to the draw line of the first draw line coder, and the draw line outer ends of the two draw line coders are connected to the same fixing point.

In a preferable embodiment, as shown in FIG. 1, the first length sensor 102 is mounted at the large head end of a corresponding joint arm, there is a predetermined distance between the basic axis of the body of the first draw line coder and the hinge axis 118 of the large head end of the corresponding joint arm, and the fixing point of the draw line outer end overlaps the hinge axis of the small head end of the corresponding joint arm; in a preferable technical solution, the basic axis of the body of the first draw line coder can also be made to keep overlapping the hinge axis 118 of the large head end of the corresponding joint arm, and the fixing point of the draw line outer end overlaps the hinge axis of the small head end of the corresponding joint arm. Therefore, the length of the joint arm after deformation can be directly obtained through the first draw line coder. Of course, as the two ends of the joint arm have small deformation, a proper part can be selected as a measurement object according to actual needs, and then the length of the joint arm after deformation is obtained.

The second length sensor 104 is mounted at the large head end of the corresponding joint arm, the vertical line between the basic axes of the bodies of the two draw line coders is perpendicular to the draw line of the first draw line coder, and the draw line outer end of the second draw line coder overlaps the hinge axis of the small head end of the corresponding joint arm.

The dip angle sensor 106 can be mounted between the body of the first draw line coder and the body of the second draw line coder, and the basic axis of the dip angle sensor 106 intersects and is perpendicular to the hinge axis at this end. Specifically, the dip angle sensor 106 can be mounted at the middle point of the connection line between the body of the first draw line coder and the body of the second draw line coder, which can make the inclination angle obtained from detection closer to the actual inclination angle of a corresponding joint arm, and then data error is reduced and the accuracy of the boom system distal end position parameters is improved. In the above embodiment, when the dip angle sensor 106 is mounted at the large head end of the corresponding joint arm, the error generated by the deformation due to the gravity of arm 1 is avoided. Likewise, when the inclination angles of the other joint arms are measured, corresponding dip angle sensors can also be mounted at the predetermined positions of the corresponding joint arms according to actual needs.

It is understandable that, when the bodies of two draw line coders are mounted at the small head end of the corresponding joint arm and the dip angle sensor 106 is mounted at the small head end of the corresponding joint arm, the inclination angle of the joint arm can also be obtained.

In the specific embodiment shown in FIG. 1, to meet the need of detecting the length of arm 1, besides its own draw line, the first draw line coder 102 is further provided with a first extension draw line 114 which inner end is connected with the draw line outer end of the first draw line coder 102, and the connection point is represented by 110 in FIG. 1. In this embodiment, in the extending direction of arm 1, there is a predetermined distance between the basic axis of the body of the first draw line coder 102 and the hinge axis of the large head end of arm 1, and the outer end of the first extension draw line 114 is connected with the hinge point 108 of the small head end of arm 1. Likewise, besides its own draw line, the second draw line coder 104 is further provided with a second extension draw line 116 which inner end is connected with the draw line outer end of the second draw line coder 104, and the connection point is represented by 112 in FIG. 1, and the outer end of the second extension draw line 116 is connected with the hinge point 108 of the small head end of arm 1.

As shown in FIG. 1, when the joint arm deforms, the draw line outer end connection point 110 corresponding to the first draw line coder and the draw line outer end connection point 112 corresponding to the second draw line coder are moving, with the deformation of the joint arm, the measurement values of the first draw line coder and the second draw line coder also change, thus, the corresponding connection points are also moving, and this operation takes it into consideration that the actual joint arm length exceeds the measurement range of the draw line coder, thus, an unchanged extension draw line is added, of course, if the measurement range of the draw line coder is sufficient to measure the length of the joint arm, the extension draw line need not be added, and then there is not the corresponding connection point.

In FIG. 1 $L_{bhi}$ is the length value of the first extension draw line 114, $L_{chi}$ is the length value of the second extension draw line 116, $L_{bgi}$ is the measurement value of the first length sensor 102, $L_{cgi}$ is the measurement value of the second length sensor 104, therefore, $L_{bi}=L_{bgi}+L_{bhi}$, and $L_{ci}=L_{cgi}+L_{chi}$. The dip angle sensor 106, which is mounted at the middle point of the connection line between the first length sensor 102 and the second length sensor 104, is used to measure the angle between a fixed side (the connection line between the first length sensor 102 and the second length sensor 104) and the reference plane, thus, when the mechanical arm presents a horizontal posture, its scale is zero.

Herein, it needs to be indicated that FIG. 2 shows a block diagram of the control part in the boom system, in the situation that the control part only shows a single joint arm, one skilled in the art should understand that, in the situation of a plurality of joint arms, there can be a plurality of dip angle sensors 106, a plurality of first length sensors 102 and a plurality of second length sensors 104, such dip angle sensors and length sensors transmit measurement values to the processor 200, then the processor 200 calculates the distal end position parameters of each joint arm, and finally the boom system distal end position parameters are obtained (that is, the distal end position parameters of the last mechanical arm).

In the above embodiment, the first draw line coder, the second draw line coder and the hinge point of the small head end of the corresponding joint arm form a triangle, and theoretically the length measured by the first draw line coder is the distance between the two hinge points of the joint arm, the second draw line coder measures the length of another side of the triangle, and the parameters of the joint arm distal end are finally determined according to cosine principle. However, due to the mechanical structure, the first draw line coder cannot directly overlap the hinge point of the large head end of the corresponding joint arm, the draw line outer end of the first draw line coder cannot directly overlap the hinge point of the small head end of the corresponding joint arm, either, the measured length is not the design length (the design length is defined as the distance between the hinge axes at two side of the joint arm during design) of the corresponding joint arm, thus the calculation error of the distal end position parameters is introduced, then a compensation method is used to compensate the deformation amount of the mechanical arm to eliminate the error, so that the finally obtained joint arm distal end position parameters are more precise.

The processor 200 is preset with a design length $L_{ir}$ of the joint arms in the boom system; after the processor 200 obtains the boom system distal end position parameters, the deformation amounts $\Delta x$ and $\Delta y$ of the boom system are obtained according to the following formulas:

$$\Delta x = x'_{Tip} - x', \quad x' = \sum_{i=1}^{n} L_i \cdot \sin\alpha_i,$$

$$\Delta y = y'_{Tip} - y', \quad y' = \sum_{i=1}^{n} L_i \cdot \cos\alpha_i,$$

$L_i$ is the measurement length of the $i^{th}$ joint arm before deformation obtained through the first length sensor, and $(x', y')$ are the distal end position parameters of the boom system before deformation; and the corrected boom system distal end position parameters $(x_{Tip}, y_{Tip})$ are obtained according to the following formulas:

$$x_{Tip} = \sum_{i=1}^{n} L_{ir} \cdot \cos\left(\arccos\frac{L_{bi}^2 + L_{ai}^2 - L_{ci}^2}{2 L_{ai} \cdot L_{bi}} - \alpha_i\right) + \Delta x,$$

$$y_{Tip} = \sum_{i=1}^{n} L_{ir} \cdot \sin\left(\arccos\frac{L_{bi}^2 + L_{ai}^2 - L_{ci}^2}{2 L_{ai} \cdot L_{bi}} - \alpha_i\right) + \Delta y.$$

The deformation amount of the boom system is first calculated, and the compensated accurate boom distal end position parameters can be obtained by adding to the deformation amount the distal end position parameters obtained according to the actual design length of the joint arm. Using the above technical solution can determine the deformation amount of the joint arm after deformation, and obtaining the boom system distal end position parameters based on the actual design length of the joint arm can avoid the data deviation rendered by the deviation between the measurement length of the length sensor and the design length of the corresponding joint arm, and then the accuracy of the boom system distal end position parameters is improved.

The engineering machinery according to the present invention comprises a mechanical body and a boom system which is mounted on the mechanical body through a swing mechanism, and the boom system is the boom system described in any of the above technical solutions. Herein, it should be understandable that the engineering machinery can be any engineering machinery having the boom system, such as a concrete truck, a climbing device and a high-altitude firefighting device.

Hereinafter, in a preset preferable coordinate system, the boom system distal end position parameter obtaining method will be detailed.

Figure 3:
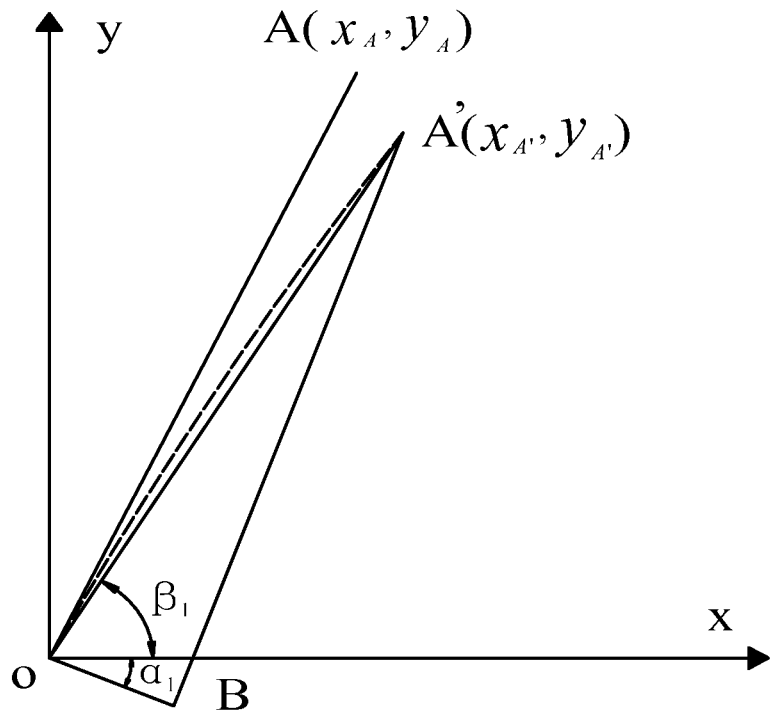
FIG. 3 is a schematic diagram of the deformation of the single joint arm according to the embodiment of the present invention.

In FIG. 3, axis A and axis Y forms a rectangular coordinate system YOX, wherein axis X is parallel to horizontal plane, axis Y is perpendicular to the horizontal plane, and the plane formed by YOX keeps perpendicular to the hinge axes at two ends of arm 1. The hinge axis of the large head end of arm 1 overlaps the coordinate origin O, A is the position of the hinge axis of the small head end of arm 1 before deformation in the rectangular coordinate system YOX, and A' is the position of the hinge axis of the small head end of arm 1 after deformation in the rectangular coordinate system.

The first joint arm of the boom system is taken as an example, as shown in FIG. 3, the origin O is the mounting position of the first draw line coder, B is the mounting position of the second draw line coder, and the dip angle sensor 106 is mounted at the middle point of the connection line between O and B. A is the distal end position of the first joint arm before deformation, and suppose the coordinate parameters of A are $(x_A, y_A)$ and the length value $L_1$ of OA is the length of the boom before deformation; A' is the distal end position of the first joint arm after deformation, and suppose the coordinate parameters of A' are (xA', yA') and OA' is the effective length $L_{b1}$ of OA after the deformation of the boom; ∠AOB is a right angle, and the angle value α1 of ∠XOB is measured by the dip angle sensor 106.

In this way, O, B and A constitute RT△OAB before the deformation of the boom, and the above O, B and A' constitute the three vertexes of the triangle after the deformation of the boom, in the two triangles OB is a side which length is constant, and the lengths of the three sides of the triangle can be obtained through the measurement of the draw line coders, and the distal end position parameters of the joint arm after deformation can be calculated in combination with the cosine principle.

The distal end position parameters (xA, yA) of the first joint arm before deformation can be obtained through the following method:

$$x_A = L_1 \times \sin\alpha_1; y_A = L_1 \times \cos\alpha_1.$$

OA' is the effective length of OA under the deformation of the boom, and $L_{bi} = L_{bg1} + L_{bh1}$ is the sum of the length of the first extension draw line 114 and the measurement value of the first draw line coder. A'B is the effective length of AB under the deformation of the boom, $L_{c1} = L_{cg1} + L_{ch1}$ is the sum of the length of the second extension draw line 116 and the measurement value of the second draw line coder, and then the angle between OA' and axis X is ∠β:

$$\angle\beta_1 = \arccos\frac{OA'^2 + OB^2 - A'B^2}{2 \times OA' \times OB} - \alpha_1 =$$

$$\arccos\frac{(L_{bg1} + L_{bh1})^2 + L_{a1}^2 - (L_{cg1} + L_{ch1})^2}{2 \times (L_{bg1} + L_{bh1}) \times L_{a1}} - \alpha_1.$$

Then, the coordinates of the distal end A' of the single joint arm calculated according to the measurement values are:

$$x_{A'} = L_{b1} \times \cos\beta_1 =$$
$$(L_{bg1} + L_{bh1}) \times \cos\left(\arccos\frac{(L_{bg1} + L_{bh1})^2 + L_{a1}^2 - (L_{cg1} + L_{ch1})^2}{2 \times (L_{bg1} + L_{bh1}) \times L_{a1}} - \alpha_1\right),$$

$$y_{A'} = L_{c1} \times \sin\beta_1 = (L_{bg1} + L_{bh1}) \times$$
$$\sin\left(\arccos\frac{(L_{bg1} + L_{bh1})^2 + L_{a1}^2 - (L_{cg1} + L_{ch1})^2}{2 \times (L_{bg1} + L_{bh1}) \times L_{a1}} - \alpha_1\right).$$

Described above is an example of determining the distal end position parameters of a single joint arm, and likewise the distal end position parameters of the other joint arms can also be obtained.

Figure 4:
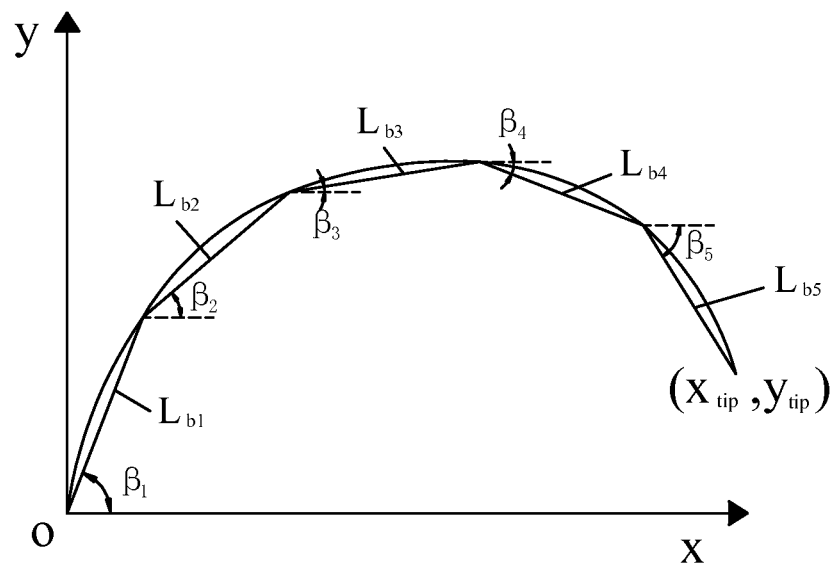
FIG. 4 is a schematic diagram of the deformations of five joint arms according to the embodiment of the present invention.

Hereinafter, referring to FIG. 4, the boom system provided by this embodiment comprises 5 joint arms sequentially hinged through a horizontal hinge shaft; the 5 joint arms are respectively called arm 1, arm 2, arm 3, arm 4 and arm 5; arm 1 is mounted on the chassis of a corresponding mechanical body, and arm 5 is a distal end arm; among the joint arms, the end close to the mechanical body is a large head end, and the opposite end is a small head end; the large head end and the small head end respectively form corresponding hinge axes, then correspondingly, in this example there are 10 sensors connected with the processor 200, there are 5 dip angle sensors connected with the processor 200, and the 5 dip angle sensors are respectively mounted on each of the 5 joint arms.

Suppose the angles measured by the dip angle sensors of the 5 joint arms are respectively $\alpha_1$, $\alpha_2$, $\alpha_3$, $\alpha_4$ and $\alpha_5$, the lengths (the distances between the actual mounting points before deformation measured by the first draw line coder) of the joint arms before the deformation are respectively $L_1$, $L_2$, $L_3$, $L_4$ and $L_5$, the measurement lengths (the distances between the actual mounting points after deformation measured by the first draw line coder 102) of the joint arms after deformation are respectively $L_{b1}$, $L_{b2}$, $L_{b3}$, $L_{b4}$ and $L_{b5}$ (corresponding to the $L_{bi}$ in the first embodiment, and the first joint arm corresponds to $L_{b1}$), and according to the calculation formula of the single joint arm in the above example, the distal end coordinates (the joint arm distal end position parameters calculated according to the measurement values) of a plurality of joint arms are obtained as follow:

$$x_{Tip} = L_{b1} \cdot \cos\beta_1 + L_{b2} \cdot \cos\beta_2 + L_{b3} \cdot \cos\beta_3 + L_{b4} \cdot \cos\beta_4 + L_{b5} \cdot \cos\beta_5$$

$$y_{Tip} = L_{b1} \cdot \sin\beta_1 + L_{b2} \cdot \sin\beta_2 + L_{b3} \cdot \sin\beta_3 + L_{b4} \cdot \sin\beta_4 + L_{b5} \cdot \sin\beta_5,$$

wherein $$\angle\beta_1 = \arccos\frac{(L_{bg1} + L_{bh1})^2 + L_{a1}^2 - (L_{cg1} + L_{ch1})^2}{2 \times (L_{bg1} + L_{bh1}) \times L_{a1}} - \alpha_1,$$

$$\angle\beta_2 = \arccos\frac{(L_{bg2} + L_{bh2})^2 + L_{a2}^2 - (L_{cg2} + L_{ch2})^2}{2 \times (L_{bg2} + L_{bh2}) \times L_{a2}} - \alpha_2,$$

$$\angle\beta_3 = \arccos\frac{(L_{bg3} + L_{bh3})^2 + L_{a3}^2 - (L_{cg3} + L_{ch3})^2}{2 \times (L_{bg3} + L_{bh3}) \times L_{a3}} - \alpha_3,$$

$$\angle\beta_4 = \arccos\frac{(L_{bg4} + L_{bh4})^2 + L_{a4}^2 - (L_{cg4} + L_{ch4})^2}{2 \times (L_{bg4} + L_{bh4}) \times L_{a4}} - \alpha_4,$$

$$\angle\beta_5 = \arccos\frac{(L_{bg5} + L_{bh5})^2 + L_{a5}^2 - (L_{cg5} + L_{ch5})^2}{2 \times (L_{bg5} + L_{bh5}) \times L_{a5}} - \alpha_5.$$

In addition, due to the mechanical structure, the first draw line coder cannot be close enough to the hinge point of the joint arm, thus, calculation error of the distal end position parameters is introduced, and hereinafter a compensation algorithm will be used to avoid such calculation error.

1) First, the deformation amount of the boom system is calculated:

For the 5 joint arms, the distal end position parameters ($x'_{Tip}$, $y'_{Tip}$) after deformation can be obtained through the following formulas:

$$x'_{Tip} = L_{b1} \times \cos\beta_1 + L_{b2} \times \cos\beta_2 + L_{b3} \times \cos\beta_3 + L_{b4} \times \cos\beta_4 + L_{b5} \times \cos\beta_5,$$

$$y'_{Tip} = L_{b1} \times \sin\beta_1 + L_{b2} \times \sin\beta_2 + L_{b3} \times \sin\beta_3 + L_{b4} \times \sin\beta_4 + L_{b5} \times \sin\beta_5,$$

The distal end position parameters before deformation are (x', y'):

$$x' = L_1 \times \sin\alpha_1 + L_2 \times \sin\alpha_2 + L_3 \times \sin\alpha_3 + L_4 \times \sin\alpha_4 + L_5 \times \sin\alpha_5,$$

$$y' = L_1 \times \cos\alpha_1 + L_2 \times \cos\alpha_2 + L_3 \times \cos\alpha_3 + L_4 \times \cos\alpha_4 + L_5 \times \cos\alpha_5,$$

The deformation amount (that is, subtracting the distal end position parameters before deformation obtained according to the measurement values from the distal end position parameters after deformation obtained according to the measurement values, thereby obtaining the deformation amount of the boom system) of the boom system is obtained according to the following formula:

$$\Delta x = x'_{Tip} - x', \Delta y = y'_{Tip} - y'.$$

2) An actual theoretical value is compensated according to the deformation amount, and accurate boom system distal end position parameters are obtained.

Suppose the lengths of the hinge points of the joint arms (the design length between the hinge points) are respectively $L_{1r}$, $L_{2r}$, $L_{3r}$, $L_{4r}$ and $L_{5r}$, accurate boom system distal end position coordinates ($x_{Tip}$, $y_{Tip}$) are obtained as follow:

$$x_{Tip} = L_{1r} \times \cos\beta_1 + L_{2r} \times \cos\beta_2 + L_{3r} \times \cos\beta_3 + L_{4r} \times \cos\beta_4 + L_{5r} \times \cos\beta_5,$$

$$y_{Tip} = L_{1r} \times \sin\beta_1 + L_{2r} \times \sin\beta_2 + L_{3r} \times \sin\beta_3 + L_{4r} \times \sin\beta_4 + L_{5r} \times \sin\beta_5,$$

For the boom system distal end position parameters so obtained, the error (that is, there is error between the joint arm length obtained according to the measurement value of the first draw line coder and the actual design length of the joint arm) introduced due to that the first draw line coder cannot accurately overlap the hinge points is eliminated, and using a single dip angle sensor (the dip angle sensor per se also has measurement error) further reduces measurement error and improves the measure precision of the mechanical arm distal end position parameter.

It should be understandable that the device for detecting lengths of the joint arms before and after deformation is not limited to the draw line coder and can also be other length sensors; and the purposes of the present invention can be achieved as long as the lengths of the joint arms before and after deformation can be detected through the length sensor.

It should be understandable that, in the coordinate system for determining the position parameters of the boom system distal end, the coordinate axes are not limited to be parallel or perpendicular to the horizontal plane, and corresponding coordinate systems can be set according to actual needs, so that a predetermined coordinate axis is parallel to a predetermined reference plane; the angles between the joint arms and the predetermined reference plane can be obtained through proper conversion of the angle values outputted by the dip angle sensors.

Based on the above description of the boom system, the boom system distal end position parameter obtaining method according to the embodiment of the present invention comprises following steps: at each joint arm, a preset distance between the first length sensor and the second length sensor being $L_{ai}$, obtaining the length $L_{bi}$ of an $i^{th}$ deformed joint arm through the first length sensor, obtaining the length $L_{ci}$ between the second length sensor and the distal end of the $i^{th}$ deformed joint arm through the second length sensor, obtaining an angle $\alpha_i$ between the connection line between the first length sensor and the second length sensor and a reference plane, wherein i=1, 2, . . . , n;

and obtaining the boom system distal end position parameters (x'$_{tip}$, y'$_{tip}$) in the rectangular coordinate system YOX according to the following formulas:

$$x'_{Tip} = \sum_{i=1}^{n} L_{bi} \cdot \cos\left(\arccos\frac{L_{bi}^2 + L_{ai}^2 - L_{ci}^2}{2L_{ai} \cdot L_{bi}} - \alpha_i\right),$$

$$y'_{Tip} = \sum_{i=1}^{n} L_{bi} \cdot \sin\left(\arccos\frac{L_{bi}^2 + L_{ai}^2 - L_{ci}^2}{2L_{ai} \cdot L_{bi}} - \alpha_i\right).$$

The above solution uses a single sensor to detect the inclination angles of the joint arms, two length sensors and the distal end of a joint arm form a triangle, the two length sensors detect two adjacent sides of the triangle, and then the determined triangle is used to calculate the distal end position parameters of the joint arms, therefore, the accumulated error generated by the precision of the dip angle sensor can be avoided, and the detection precision of the joint arm length can also be easily ensured through using a proper length sensor to detect the lengths of the joint arms before and after the deformation, and then the position parameters of the boom system distal end can be obtained more precisely.

Due to the mechanical structure, the first draw line coder cannot directly overlap the hinge point of the large head end of the corresponding joint arm, the draw line outer end of the first draw line coder cannot directly overlap the hinge point of the small head end of the corresponding joint arm, either, thus the calculation error of the distal end position parameters is introduced, then a compensation method is used to compensate the deformation amount of the mechanical arm. The compensation method comprises following steps: obtaining the deformation amounts $\Delta x$ and $\Delta y$ of the boom system according to the following formulas:

$$\Delta x = x'_{Tip} - x', \quad x' = \sum_{i=1}^{n} L_i \cdot \sin\alpha_i,$$

$$\Delta y = y'_{Tip} - y', \quad y' = \sum_{i=1}^{n} L_i \cdot \cos\alpha_i,$$

$L_i$ is the measurement length of the $i^{th}$ joint arm before deformation obtained through the first length sensor, and (x', y') are the distal end position parameters of the boom system before deformation; the corrected boom system distal end position parameters ($x_{Tip}$, $y_{Tip}$) are obtained according to the obtained deformation amounts, and $L_{ir}$ is the design length of the $i^{th}$ joint arm:

$$x_{Tip} = \sum_{i=1}^{n} L_{ir} \cdot \cos\left(\arccos\frac{L_{bi}^2 + L_{ai}^2 - L_{ci}^2}{2L_{ai} \cdot L_{bi}} - \alpha_i\right) + \Delta x,$$

$$y_{Tip} = \sum_{i=1}^{n} L_{ir} \cdot \sin\left(\arccos\frac{L_{bi}^2 + L_{ai}^2 - L_{ci}^2}{2L_{ai} \cdot L_{bi}} - \alpha_i\right) + \Delta y.$$

Therefore, obtaining the boom system distal end position parameters based on the actual design length of the joint arm can avoid the data deviation rendered by the deviation between the measurement length of the length sensor and the design length of the corresponding joint arm, and then the accuracy of the boom system distal end position parameters is improved.

In the above technical solution, $L_{bi}$ is the measurement length between the hinge points at two ends of the $i^{th}$ deformed joint arm, $L_{ci}$ is the measurement length between the second length sensor and the hinge point at the distal end of the $i^{th}$ joint arm, $L_i$ is the measurement length between the hinge points at two ends of the $i^{th}$ joint arm before deformation, and $L_{ir}$ is the design length between the hinge points at two ends of the $i^{th}$ joint arm.

The technical solutions according to the present invention use three-fixing point measuring (the mounting fixing point of the first draw line coder, the mounting fixing point of the second draw line coder and the hinge point of the small head end) to obtain the boom system distal end position parameters, use a single dip angle sensor, reduce the error generated by the measuring error of the dip angle sensor, use the draw line coding sensor to obtain the lengths of the mechanical arm before and after the deformation, then achieve a high detection precision, solve the technical problem that the deformation of traditional mechanical arms cannot be measured accurately, and achieve precise and stable control over the distal end position through obtaining the deformation amounts.

Described above are just preferable embodiments of the present invention and are not intended to restrict the present invention. For one skilled in the art, the present invention may have various modifications and variations. Any modifications, equivalent substitutions, improvements and etc. within the spirit and principle of the present invention shall all be contained within the scope of protection of the present invention.

What is claimed is:

1. A boom system comprising n joint arms sequentially hinged through a horizontal hinge shaft, a processor, n dip angle sensors and 2n length sensors, and n being a positive integer, wherein each joint arm is mounted with a first length sensor and a second length sensor; at the $i^{th}$ joint arm, the predetermined distance between the second length sensor and the first length sensor is $L_{ai}$, the length $L_{bi}$ of the $i^{th}$ deformed joint arm is obtained through the first length sensor, and the length $L_{ci}$ between the second length sensor and the distal end of the $i^{th}$ deformed joint arm is obtained through the second length sensor;

each joint arm is mounted with one said dip angle sensor, an angle $\alpha_i$ between the connection line between the first length sensor and the second length sensor and a reference plane is obtained, wherein i=1, 2, . . . , n;

the processor obtains boom system distal end position parameters (x'$_{tip}$, y'$_{tip}$) according to the detection results of the dip angle sensor and the length sensors:

$$x'_{Tip} = \sum_{i=1}^{n} L_{bi} \cdot \cos\left(\arccos\frac{L_{bi}^2 + L_{ai}^2 - L_{ci}^2}{2L_{ai} \cdot L_{bi}} - \alpha_i\right),$$

$$y'_{Tip} = \sum_{i=1}^{n} L_{bi} \cdot \sin\left(\arccos\frac{L_{bi}^2 + L_{ai}^2 - L_{ci}^2}{2L_{ai} \cdot L_{bi}} - \alpha_i\right).$$

2. The boom system of claim 1, wherein the connection line between the first length sensor and the second length sensor is perpendicular to the extending directions of corresponding booms, and the dip angle sensor is mounted between two length sensors.

3. The boom system of claim 2, wherein the first length sensor is a first draw line coder, and the body of the first draw line coder and a draw line outer end are respectively connected with two ends of corresponding joint arms.

4. The boom system of claim 3, wherein
the second length sensor is a second draw line coder, and the body of the second draw line coder and a draw line outer end are respectively connected with two ends of corresponding joint arms;
the vertical line between the basic axis of the body of the first draw line coder and the basic axis of the body of the second draw line coder is perpendicular to the draw line of the first draw line coder, and the draw line outer ends of the two draw line coders are connected to the same fixing point.

5. The boom system of claim 3, wherein
the basic axis of the body of the first draw line coder overlaps the hinge axis at one end of a corresponding joint arm, and the fixing point of the draw line outer ends overlaps the hinge axis at the other end of the corresponding joint arm; or
the basic axis of the body of the first draw line coder has a predetermined distance with respect to the hinge axis at one end of the corresponding joint arm, and the fixing point of the draw line outer ends overlaps the hinge axis at the other end of the corresponding joint arm.

6. The boom system of claim 4, wherein
the basic axis of the body of the first draw line coder overlaps the hinge axis at one end of a corresponding joint arm, and the fixing point of the draw line outer ends overlaps the hinge axis at the other end of the corresponding joint arm; or
the basic axis of the body of the first draw line coder has a predetermined distance with respect to the hinge axis at one end of the corresponding joint arm, and the fixing point of the draw line outer ends overlaps the hinge axis at the other end of the corresponding joint arm.

7. The boom system according to claim 4, wherein the dip angle sensor is mounted between the body of the first draw line coder and the body of the second draw line coder, and the basic axis of the dip angle sensor intersects and is perpendicular to the hinge axis at this end.

8. The boom system according to claim 7, wherein the dip angle sensors are respectively mounted at the large head ends of corresponding joint arms.

9. The boom system of claim 1, wherein the processor is further preset with a design length $L_{ir}$ of the joint arms in the boom system;
after the processor obtains the boom system distal end position parameters, the deformation amounts $\Delta x$ and $\Delta y$ of the boom system are obtained according to the following formulas:

$$\Delta x = x'_{Tip} - x', \quad x' = \sum_{i=1}^{n} L_i \cdot \sin\alpha_i,$$

$$\Delta y = y'_{Tip} - y', \quad y' = \sum_{i=1}^{n} L_i \cdot \cos\alpha_i,$$

the $L_i$ is the measurement length of the $i^{th}$ joint arm before deformation obtained through the first length sensor, and (x', y') are the distal end position parameters of the boom system before deformation; and the corrected boom system distal end position parameters ($x_{Tip}$, $y_{Tip}$) are obtained according to the following formulas:

$$x_{Tip} = \sum_{i=1}^{n} L_{ir} \cdot \cos\left(\arccos\frac{L_{bi}^2 + L_{ai}^2 - L_{ci}^2}{2L_{ai} \cdot L_{bi}} - \alpha_i\right) + \Delta x,$$

$$y_{Tip} = \sum_{i=1}^{n} L_{ir} \cdot \sin\left(\arccos\frac{L_{bi}^2 + L_{ai}^2 - L_{ci}^2}{2L_{ai} \cdot L_{bi}} - \alpha_i\right) + \Delta y.$$

10. An engineering machinery, comprising a machinery body and a boom system, and the boom system being mounted on the machinery body through a swing mechanism, characterized in that the boom system is the boom system of claim 1.

11. A method for acquiring boom system distal end position parameter, comprising following steps:
at each joint arm, a preset distance between a first length sensor and a second length sensor being $L_{ai}$, obtaining the length $L_{bi}$ of an $i^{th}$ deformed joint arm through the first length sensor, obtaining the length $L_{ci}$ between the second length sensor and the distal end of the $i^{th}$ deformed joint arm through the second length sensor, obtaining an angle $\alpha_i$ between the connection line between the first length sensor and the second length sensor and a reference plane, wherein i=1, 2, . . . , n; and
obtaining the boom system distal end position parameters ($x'_{tip}$, $y'_{tip}$) according to the following formulas:

$$x'_{Tip} = \sum_{i=1}^{n} L_{bi} \cdot \cos\left(\arccos\frac{L_{bi}^2 + L_{ai}^2 - L_{ci}^2}{2L_{ai} \cdot L_{bi}} - \alpha_i\right),$$

$$y'_{Tip} = \sum_{i=1}^{n} L_{bi} \cdot \sin\left(\arccos\frac{L_{bi}^2 + L_{ai}^2 - L_{ci}^2}{2L_{ai} \cdot L_{bi}} - \alpha_i\right).$$

12. The method of claim 11, further comprising the following steps after obtaining the boom system distal end position parameters:
obtaining the deformation amounts $\Delta x$ and $\Delta y$ of the boom system according to the following formulas:

$$\Delta x = x'_{Tip} - x', \quad x' = \sum_{i=1}^{n} L_i \cdot \sin\alpha_i,$$

$$\Delta y = y'_{Tip} - y', \quad y' = \sum_{i=1}^{n} L_i \cdot \cos\alpha_i,$$

$L_i$ is the measurement length of the $i^{th}$ joint arm before deformation, and $(x', y')$ are the distal end position parameters of the boom system before deformation; and the corrected boom system distal end position parameters $(x_{Tip}, y_{Tip})$ are obtained according to the obtained deformation amounts, and $L_{ir}$ is the design length of the $i^{th}$ joint arm:

$$x_{Tip} = \sum_{i=1}^{n} L_{ir} \cdot \cos\left(\arccos\frac{L_{bi}^2 + L_{ai}^2 - L_{ci}^2}{2 L_{ai} \cdot L_{bi}} - \alpha_i\right) + \Delta x,$$

$$y_{Tip} = \sum_{i=1}^{n} L_{ir} \cdot \sin\left(\arccos\frac{L_{bi}^2 + L_{ai}^2 - L_{ci}^2}{2 L_{ai} \cdot L_{bi}} - \alpha_i\right) + \Delta y.$$

13. The method of claim 12, wherein $L_{bi}$ is the measurement length between the hinge points at two ends of the $i^{th}$ deformed joint arm, $L_{ci}$ is the measurement length between the second length sensor and the hinge point at the distal end of the $i^{th}$ joint arm, $L_i$ is the measurement length between the hinge points at two ends of the $i^{th}$ joint arm before deformation, and $L_{ir}$ is the design length between the hinge points at two ends of the $i^{th}$ joint arm.

* * * * *